US009633495B2

(12) United States Patent
Ligeski et al.

(10) Patent No.: US 9,633,495 B2
(45) Date of Patent: Apr. 25, 2017

(54) SYSTEM AND METHOD FOR WIRELESSLY AUTHENTICATING A DEVICE HAVING A SENSOR

(71) Applicant: Caterpillar Inc., Peoria, IL (US)

(72) Inventors: Scott E. Ligeski, Peoria, IL (US); Mark T. DeCou, Peoria, IL (US); Arjun Veneshetty, Dunlap, IL (US); Joshua D. Reed, Galesburg, IL (US); Bradley F. Bergerhouse, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/816,506

(22) Filed: Aug. 3, 2015

(65) Prior Publication Data
US 2017/0039788 A1 Feb. 9, 2017

(51) Int. Cl.
G07C 9/00 (2006.01)
H04M 1/725 (2006.01)
G07C 3/00 (2006.01)
G07C 11/00 (2006.01)
H04W 84/18 (2009.01)

(52) U.S. Cl.
CPC ........... *G07C 9/00015* (2013.01); *G07C 3/00* (2013.01); *G07C 11/00* (2013.01); *G07C 2209/02* (2013.01); *H04M 1/7253* (2013.01); *H04W 84/18* (2013.01)

(58) Field of Classification Search
None
See application file for complete search history.

(56) References Cited

U.S. PATENT DOCUMENTS

| 8,825,222 B2 | 9/2014 | Namburu et al. |
| 9,162,648 B1* | 10/2015 | Weng .................... B60R 25/24 |
| 2007/0001805 A1 | 1/2007 | Utter et al. |
| 2007/0273477 A1 | 11/2007 | Philipson |
| 2008/0059806 A1 | 3/2008 | Kishida et al. |
| 2009/0267734 A1 | 10/2009 | Kwon |
| 2009/0291637 A1* | 11/2009 | Alrabady ............ H04L 63/0442 455/41.2 |
| 2012/0244803 A1* | 9/2012 | Sudou ................ H04M 1/7253 455/41.1 |
| 2013/0167227 A1 | 6/2013 | Miura et al. |
| 2013/0176107 A1* | 7/2013 | Dumas ............... G07C 9/00571 340/5.61 |

(Continued)

FOREIGN PATENT DOCUMENTS

| WO | 2014200414 | 12/2014 |
| WO | 2015061646 | 4/2015 |

*Primary Examiner* — Leon-Viet Nguyen
(74) *Attorney, Agent, or Firm* — Hibshman Claim Construction PLLC (57) ABSTRACT

A method for wireless authentication of a device to a machine is provided. The device has a sensor and the method includes sensing, by a sensor of the device, a first input pattern of physical parameters received at the device. The method includes wirelessly transmitting, from the device, an identification signal to a machine upon said sensing of the first input pattern. The method includes wirelessly receiving, at the device, an authentication signal indicating an authentication of the device, wherein the device is configured to interact with the machine upon the wireless receiving of the authentication.

20 Claims, 4 Drawing Sheets

(56) References Cited

U.S. PATENT DOCUMENTS

| | | | |
|---|---|---|---|
| 2013/0237193 A1* | 9/2013 | Dumas | G07C 9/00571 |
| | | | 455/414.1 |
| 2013/0257777 A1* | 10/2013 | Benko | G06F 3/03545 |
| | | | 345/173 |
| 2013/0329890 A1 | 12/2013 | Kawamura et al. | |
| 2014/0075186 A1 | 3/2014 | Austen | |
| 2015/0261298 A1* | 9/2015 | Li | G06F 3/017 |
| | | | 345/156 |

* cited by examiner

SYSTEM AND METHOD FOR WIRELESSLY AUTHENTICATING A DEVICE HAVING A SENSOR

TECHNICAL FIELD

This patent disclosure generally relates to devices for machines, and more particularly, to systems and methods for wireless authentication of a device to a machine, the device having a sensor.

BACKGROUND

Conventional systems and methods for devices for machines include a predetermined list of devices whose identities are stored in a memory of the machine prior to a particular device in the list being used. Examples of such devices include electronic key fobs for accessing an operator cab of the machine, a work tool attachable to the machine, and the like. In use, the device simply has to transmit its device identifier to a reader or a computer, and the identifier is then matched up with the predetermined list to determine if the device is a known device. Such transmission of the device identifier may occur automatically without a manual input or a user input when the device is in a vicinity of the reader or the computer. Alternatively, some conventional devices have a user interface (e.g., push buttons) that are used to initiate transmission of the device identifier to the reader or the computer based upon a manual input to the user interface. An example conventional system where individual electronic keys may be authenticated for control of multiple vehicles is disclosed in U.S. Patent Application Publication No. 2007/0001805.

However, conventional systems and methods work with known devices only that have been manually added to the machine's list of devices, such devices having user interface(s) customized to let the user of the device to initiate a communication between the device and the machine.

The present disclosure addresses these problems and other problems associated with the conventional systems and methods.

SUMMARY

In one aspect of this disclosure, a method for wireless authentication of a device to a machine is provided. The device has a sensor and the method includes sensing, by a sensor of the device, a first input pattern of physical parameters received at the device. The method includes wirelessly transmitting, from the device, an identification signal to a machine upon said sensing of the first input pattern. The method includes wirelessly receiving, at the device, an authentication signal indicating an authentication of the device, wherein the device is configured to interact with the machine upon the wireless receiving of the authentication.

In another aspect of this disclosure, a system for wireless identification of a device for a machine is provided. The system includes a machine including an electronic controller unit. The electronic controller unit includes a machine processor and a memory coupled to the machine processor. The memory includes a list of devices associated with the machine. The system includes a device having a sensor configured to sense a first input pattern of physical parameters received at an exterior surface of the device, the exterior surface being a user-interface free surface. The device includes a device processor coupled to the sensor, said device processor configured to wirelessly transmit an identification signal to the machine processor based upon the first input pattern, and wirelessly receive an authentication signal from the machine processor indicating an authentication of the device.

In yet another aspect of this disclosure, a non-transitory computer readable medium on a device for a machine is provided. The non-transitory computer readable medium includes computer executable instructions for wirelessly authenticating the device to the machine. The computer executable instructions when executed by a device processor cause the device processor to receive an output from a sensor on the device, the output corresponding to a first input pattern of physical parameters received on the device and sensed by the sensor, wirelessly transmit an identification signal to a machine processor in the machine based upon the output of the sensor of the device, and wirelessly receive an authentication signal from the machine processor indicating an authentication of the device to the machine.

In still another aspect of this disclosure, a machine is provided. The machine includes an electronic controller unit. The electronic controller unit includes a memory and a machine processor coupled to the memory. The machine processor is configured to wirelessly receive an identification signal from a device in a plurality of devices, the identification signal including an identification of the device, the identification signal being generated by the device based upon a first input pattern sensed by a sensor of the device. The machine processor is configured to identify the device using a list of devices in the memory of the machine based upon the identification signal. The machine processor is configured to wirelessly transmit an authentication signal to the device based upon an identification of the device, wherein the machine is accessed or operated upon using the device based on the authentication signal. The machine processor is configured to add the identification of the device to the list of devices when the device is not listed in the list of devices. The machine processor is configured to wirelessly receive a disassociation signal from the device, the disassociation signal being generated by the device based upon a second input pattern sensed by the sensor of the device. The machine processor is configured to delete the identification of the device from the list of devices based upon the disassociation signal.

DETAILED DESCRIPTION

Conventional systems and methods for machines are unable to handle scenarios where a device to be authenticated to a machine has no pre-existing user interface on its external surface. Further, conventional systems and methods are unable to add a new device to a list of valid devices associated with that machine when the device is presented without prior knowledge of the machine or a computer in the machine, and/or when that device does not have a user interface to initiate a request for association with the machine. In such scenario, when a new device is presented to the machine, a system administrator or a back-office personnel may have to be contacted to add the new device manually, causing delays and lost opportunity for immediate access to the machine by valid devices. Similarly, deletion of such devices from the list of authorized devices has to be carried out at a back-office at the system administrator level manually.

Various aspects of this disclosure are related to addressing the problems in the conventional systems and methods for authentication of devices by a machine, particularly when the devices are presented without prior knowledge of the devices to the machine for association with the machine. Various aspects of this disclosure provide specific details of wireless authentication of a device by a machine when such a device does not have a user interface built on an exterior surface of the device to interact with the machine.

Figure 1:
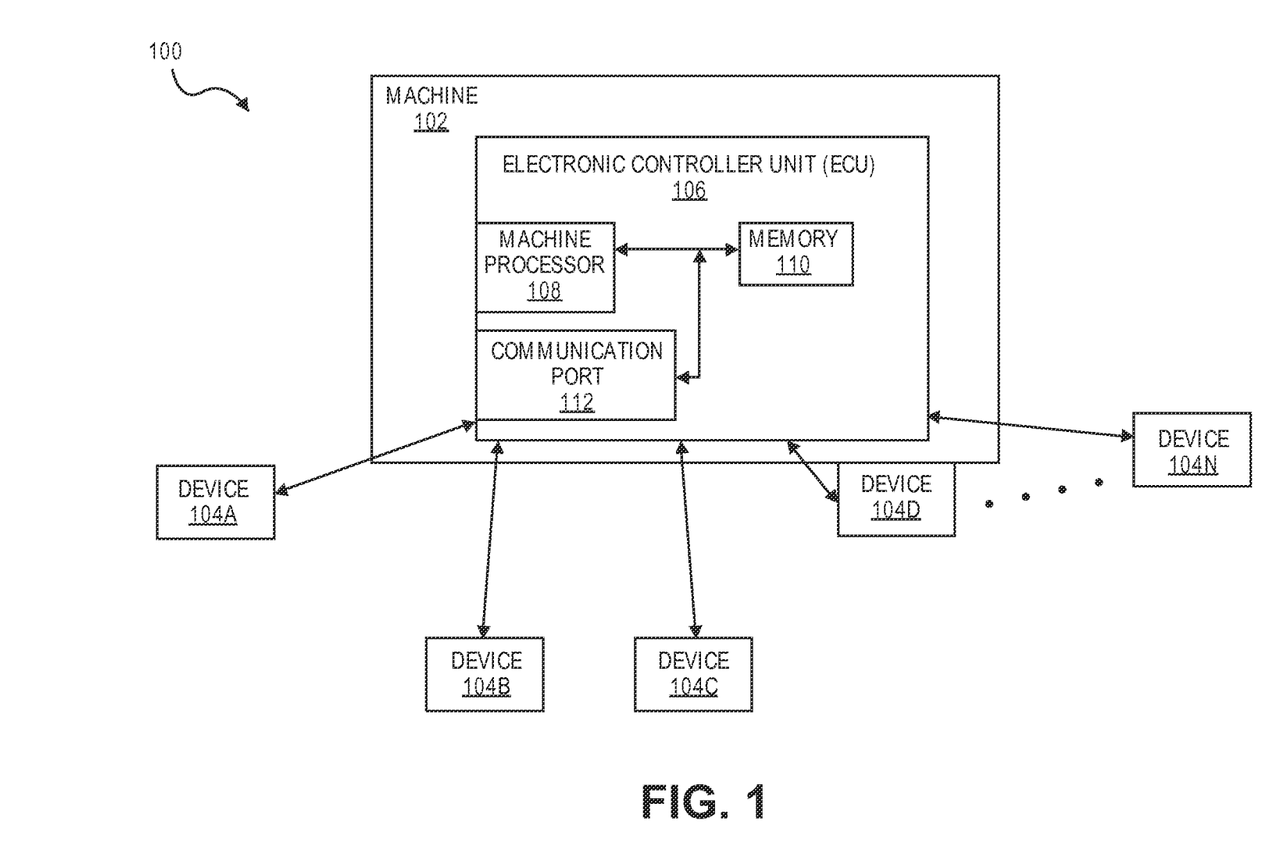
FIG. 1 illustrates a system for wireless authentication of a device for a machine, in accordance with an aspect of this disclosure.

Now referring to the drawings, where like reference numerals refer to like elements, FIG. 1 illustrates a system 100 for wireless identification of one or more devices 104a, 104b, . . . , 104n ('n' being an integer), by a machine 102, in accordance with an aspect of this disclosure. The devices 104a-104n may include, but are not limited to, electronic key fobs, various types of work tools attachable or usable with the machine, or combinations thereof. It will be appreciated that the system 100 is not limited to the machine 102 and the devices 104a-104n as additional number of devices and machines may be present in the system 100, for example, those used at a worksite where the machine 102 may be deployed. Further, the system 100 may include additional or optional components, including but not limited to, a remote base station with which the machine 102 and/or the devices 104a-104n may communicate, a satellite positioning system, robotic or humanoid robotic components, antennas, cameras, and the like. It will be appreciated that the devices 104a-104n may be physically separated from the machine 102, or at least one, at least more than one, or all of the devices 104a-104n may be located on the machine 102, and the specific location of the devices 104a-104n may vary depending on the specific applications and examples of the devices 104a-104n.

The devices 104a-104n may be in wireless communication with the machine 102 or may be capable of establishing a wireless communication channel with the machine 102. In one aspect, such wireless communication may be in addition to or independent of a wired communication channel between the devices 104a-104n and the machine 102. Further, the wireless communication between the machine 102 and the devices 104a-104n may occur using one or more wireless standards, including but not limited to, Bluetooth®, WiFi™, Near Field Communications (NFC), and the like. For example, the wireless communication between the devices 104a-104n may occur over acoustic frequencies, radio frequencies, optical frequencies, or higher frequencies, or combinations thereof. The devices 104a-104n may be within a wireless communication range of the machine 102, the wireless communication range being defined based upon the respective wireless communication standards that the devices 104a-104n use to communicate with the machine 102. For example, the devices 104a-104n may be within a few feet (e.g., 1 ft or more) to several hundreds of feet (e.g., more than 100 ft) from the machine 102.

The machine 102 may be a mechanical, an electrical, and/or an electro-mechanical machine that may be stationary relative to the ground or may be mobile on a worksite. Generally, the machine 102 may be associated with industries such as mining, construction, agriculture, landscaping, and the like. For example, the machine 102 may be a dozer, an off-highway truck, a skid steer loader (SSL), a multi-terrain loader (MTL), a compact track loader (CTL), a compact wheel loader (CWL), a backhoe loader, a wheel loader, an excavator, a harvester, a mower, a driller, a hammer-head, a locomotive, a ship, a boat, an automobile, a tractor, or other machine to which the devices 104a-104n identify themselves to and gain access to for various reasons (e.g., for operating the machine 102, repair and/or replacement of parts of the machine 102, entry into an operator cab of the machine 102, unlocking the machine 102, etc.). In another example, the machine 102 may be a heavy electrical machine, a crane motor, and the like, for which the devices 104a-104n may be used to turn on and off, to generally modify a parameter of, or to interact with (e.g., alter speed, operating mode, run diagnostics, etc.).

In one aspect, the machine 102 includes an electronic controller unit (ECU) 106, interchangeably referred to as an electronic controller module (ECM). It will be appreciated that depending upon a type of the machine 102, the machine 102 may have additional components, including but not limited to, hydraulic systems, engines, batteries, ground-engagement mechanisms, operator cabs, chassis, exhaust systems, heating and cooling systems, fuel tanks, communication systems and antennas, sensors, hood or cover for parts, sensor systems, and the like, which components are not explicitly illustrated in FIG. 1.

The electronic controller unit 106 may be located on-board the machine 102, for example, inside a durable box or a cover. For example, the ECU 106 may be located inside a chassis of the machine 102. Further, the machine 102 may include a plurality of ECUs and the ECU 106 illustrated in FIG. 1 is by way of example only and not by way of limitation. The electronic controller unit 106 may include a machine processor 108, a memory 110, and a communication port 112 coupled to each other by an internal bus. The electronic controller unit 106 may include additional components known to one of ordinary skill in the art, which components are not explicitly illustrated in FIG. 1. For example, the electronic controller unit 106 may include a programmable logic circuit (PLC), a timer/clocking circuit, heat sinks, visual indicators (e.g., light emitting diodes), impedance matching circuitry, internal buses, co-processors or monitor processors, bus controllers, batteries and power supply units, power controller chips, transceivers, wireless modules, satellite communication processing modules, and embedded systems on various integrated chips on one or more printed circuit boards (PCBs).

The communication port 112 may be a single port or a collection of ports. The communication port 112 is configured to transmit and receive various inputs and data from the devices 104a-104n wirelessly once a wireless communication has been established and the devices 104a-104n have been identified by the machine processor 108. In addition, the communication port 112 may be configured to receive signals from and/or transmit signals to other parts of the machine 102 and forward such signals to the machine processor 108. In one aspect, the communication port 112 may be two separate ports, one configured to transmit/receive various output/input signals to/from various parts of the machine 102 (e.g., sensors, inertial measurement units, etc.,) and another configured to transmit/receive wireless signals to/from the devices 104a-104n.

In one aspect, the machine processor 108 is a hardware device such as an integrated circuit (IC) chip fabricated to implement various features and functionalities of the aspects discussed herein. By way of example only and not by way of limitation, the machine processor 108 may be fabricated using a Complementary Metal Oxide Semiconductor (CMOS) fabrication technology. The machine processor 108 may be implemented as an Application Specific Integrated Circuit (ASIC), a Field Programmable Gate Array (FPGA), a System-on-a-Chip (SOC), or the like. The machine processor 108 may include components such as packaging, input and output pins, heat sinks, signal conditioning circuitry, input devices, output devices, processor memory components, cooling systems, power systems and the like, which are not shown in FIG. 1. The machine processor 108 may be configured to execute software associated with operation of various parts of the machine 102 and to provide response to the devices 104a-104n.

The memory 110 may be implemented as a non-transitory computer readable medium. Such non-transitory computer readable storage medium may include semiconductor memory, optical memory, magnetic memory, mono- or bi-stable circuitry (flip-flops, etc.) and the like, or combinations thereof. Such non-transitory computer readable storage medium excludes signals that are transitory. By way of example only, the memory 110 may be a semiconductor based memory device including but not limited to random access memory (RAM), read only memory (ROM), Dynamic RAM, Programmable ROM, Electrically Erasable programmable ROM (EEPROM), Static RAM, Flash memory, combinations thereof, or other types of memory devices known to one of ordinary skill in the art. The memory 110 may be coupled to the machine processor 108 directly via an internal bus.

In one aspect, the devices 104a-104n may be a set of electronic key fobs. Such key fobs may be used to gain access to the machine 102, for example, by a human operator to operate the machine 102. Such key fobs may not have any form of push-buttons or other mechanical/electro-mechanical user interfaces or physical features on one or more exterior or outside surfaces thereof. As such, when the devices 104a-104n are key fobs, the devices 104a-104n may have smooth and continuous exterior or outside surfaces.

In another aspect, the devices 104a-104n may be a set of work tools. Such work tools may be attachable to the machine 102 for various purposes depending upon the specific applications for which the machine 102 is used. For example, the work tool may be a bucket that needs to be attached to an excavator arm (not shown) of the machine 102. In another example, the work tool may be a tire, filled with gas or air at a pressure, which needs to replace a deflated tire of the machine 102. In yet another example, the work tool may be a machine part having an optical sensor such that the machine part needs to be removed (e.g., for regular maintenance) and a new machine part needs to be installed. In all such examples of the work tools, the work tools may not have any form of push-buttons or other mechanical/electro-mechanical user interfaces or features on exterior or outside surfaces thereof. As such, similar to key fobs, when the devices 104a-104n are work tools, the devices 104a-104n may have a continuous exterior or outside surfaces, or surfaces that do not require a user to provide an input thereto.

Therefore, when viewed from outside, an untrained user of the devices 104a-104n may not know how to use the devices 104a-104n to communicate with the machine 102, and may have to incorrectly presume that such a communication will happen automatically with the machine 102. However, as discussed with respect to FIGS. 2-4, various aspects of this disclosure allow the devices 104a-104n to receive predefined mechanical inputs, electrical inputs, magnetic inputs, optical inputs, acoustic inputs, chemical inputs, thermal inputs, and/or combinations thereof, to associate the devices 104a-104n with the machine 102 and subsequently disassociate with the machine 102. Further, it will be appreciated by one of ordinary skill in the art that the devices 104a-104n may be of different types. For example, one or more of the devices 104a-104n may be key fobs, while the remaining of the devices 104a-104n may be work tools (on-board and/or off-board the machine 102).

Figure 2:
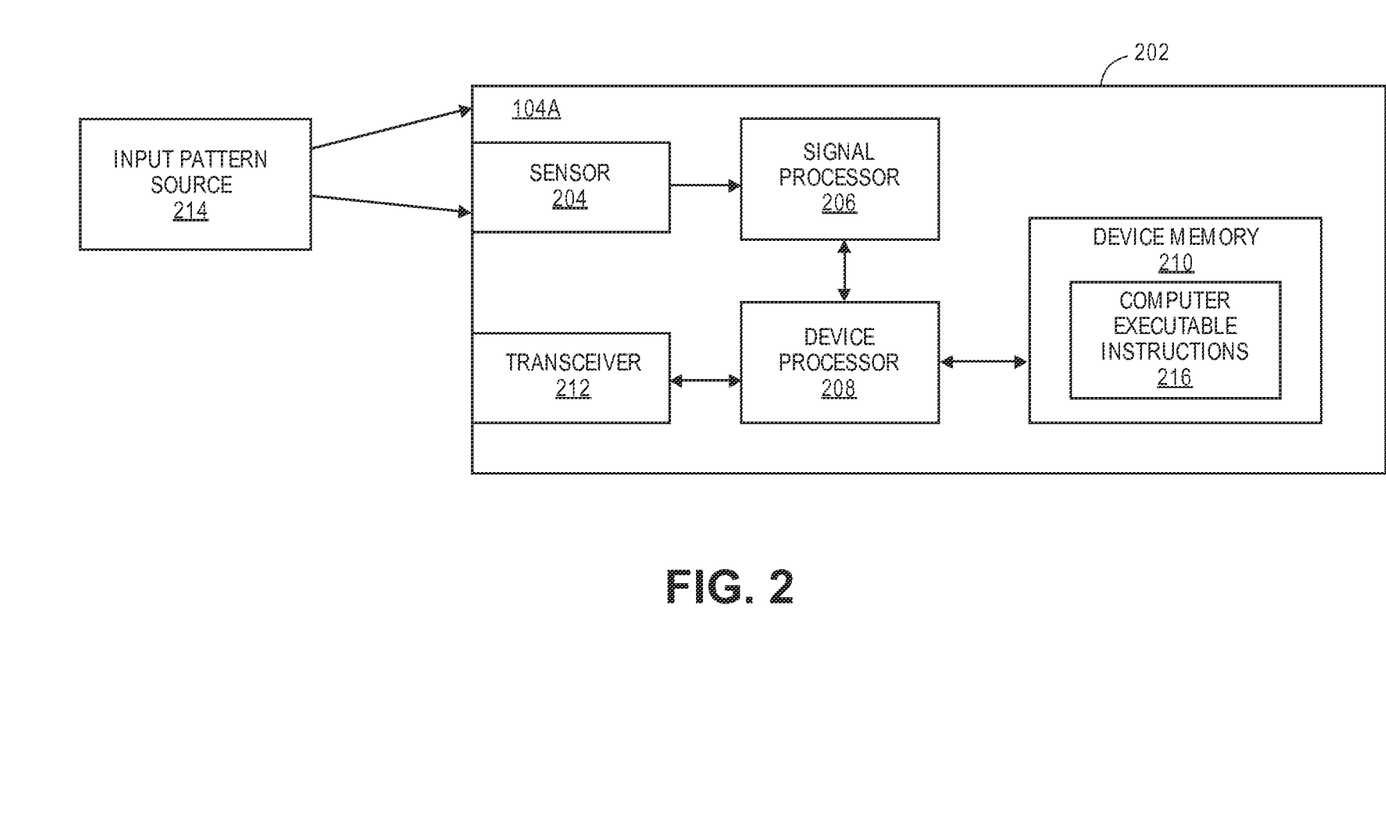
FIG. 2 illustrates a block diagram for an exemplary device used for wireless authentication to the machine of FIG. 1, in accordance with an aspect of this disclosure.

Referring now to FIG. 2, internal details of the devices 104a-104n are illustrated, using the device 104a as an example, in accordance with an aspect of this disclosure. The device 104a includes an exterior surface 202 inside which may reside a sensor 204, a signal processor 206, a device processor 208, a device memory 210, and a transceiver 212. The device 104a may include additional circuitry and components such as batteries, filters to reject interference from remaining ones of the devices 104b-104n, and other components specific to the function for which the device 104a may be used in the system 100. For example, when the device 104a is a work tool, the device 104a may include additional components such as actuators, couplers, latches, electro-magnets, etc., that allow the device 104a to couple to the machine 102 and operate once the device 104a has coupled to the machine 102. The sensor 204, the signal processor 206, the device processor 208, the device memory 210, and the transceiver 212, as well as the additional circuitry may be implemented in one or more integrated circuits (ICs) and/or discrete electronic components residing on one or more printed circuit boards (PCBs) inside the device 104a.

The exterior surface 202 may be a plain continuous surface having no distinguishable physical features thereupon. The exterior surface 202 is a user-interface free surface in the sense that the exterior surface 202 does not have thereupon any buttons, keys, track pads, touch-screens, and the like, or combinations thereof. An absence of such a user-interface on the exterior surface 202 may prevent an untrained user to use the device 104a or to initiate a communication or interaction with the machine 102. Such user-interface free structure of the exterior surface 202 may be contrasted with, for example, a surface of an electronic car key used to unlock or open doors of a car. Unlike the electronic car key that has one or more push buttons that receive inputs to unlock the door(s) of the car, the exterior surface 202 of the device 104a does not have any mechanical or electro-mechanical interfaces. For example, when the devices 104a-104n are electronic key fobs, the exterior surface 202 is one continuous surface, or is assembled by joining two or more continuous surfaces made of durable hard plastic such as high-density polyethylene (HDPE), although other types of hard surfaces, e.g., metallic alloys, composite materials, etc., could be used.

Likewise, when the device 104a is a work tool, the exterior surface 202 is similar to a conventional work tool surface with no user-interface that may allow a user of the device 104a to initiate a wireless communication between the device 104a and the machine 102. For example, when the device 104a is a specific type of a tire unique to a type of the machine 102 and is to be attached to the machine 102, the exterior surface 202 of such a tire may be similar to that of other conventional tires that do not have any form of an interface to accept a user input to wirelessly identify and/or authenticate the tire to communicate with the machine 102.

Figure 3:
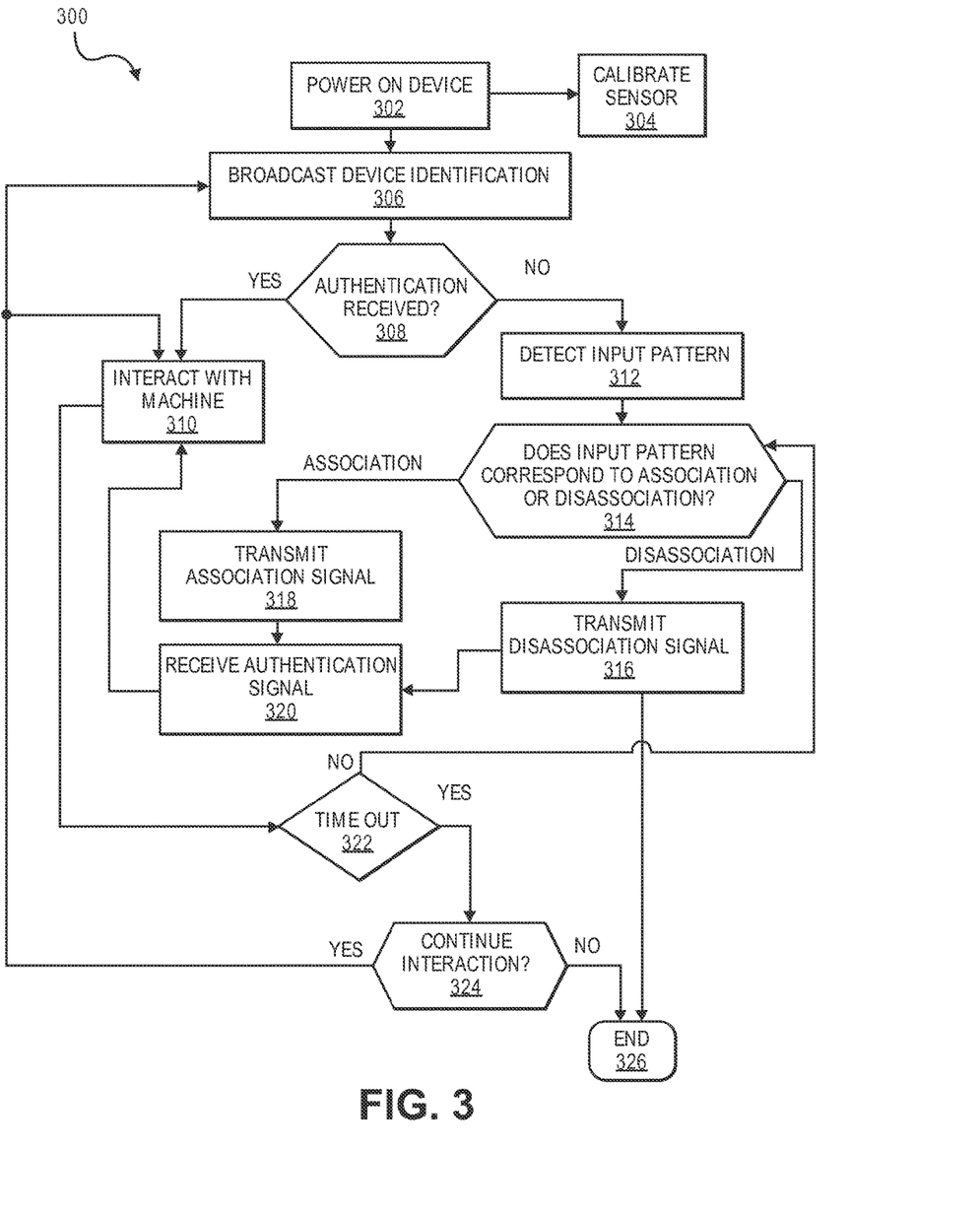
FIG. 3 illustrates a method for wireless authentication of a device for a machine, in accordance with an aspect of this disclosure.
Figure 4:
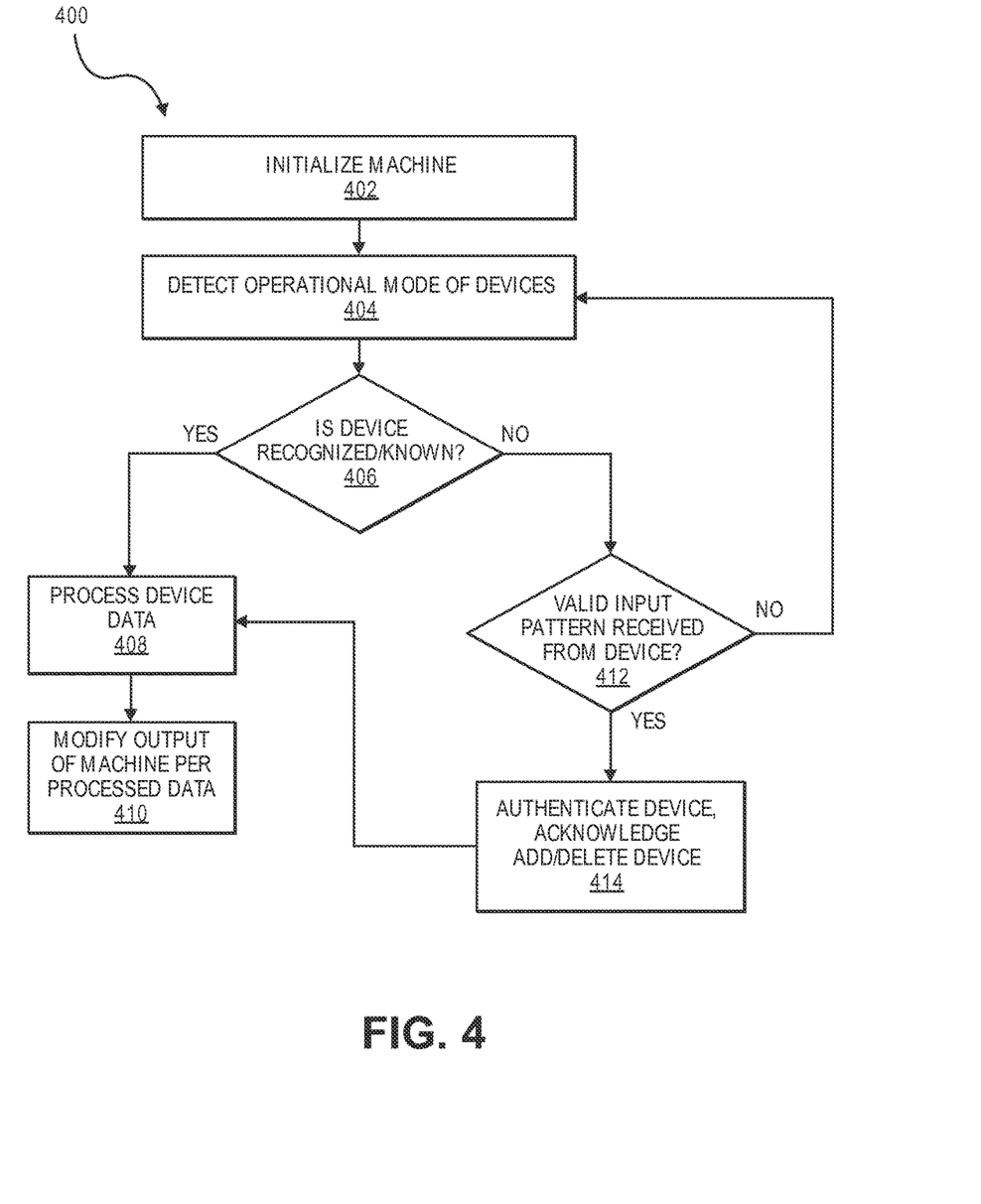
FIG. 4 illustrates a method carried out by the machine of FIG. 1, in accordance with an aspect of this disclosure.

However, as discussed with respect to FIGS. 3-4, due at least in part to the presence of the sensor 204, the device processor 208, and the device memory 210, the exterior surface 202 may be configured to receive inputs or input patterns from an input pattern source 214 and/or a human being at one or more places on the exterior surface 202 of the device 104a. The input pattern source 214 is configured to provide a plurality of input patterns of physical parameters on the device 104a (e.g., anywhere on the exterior surface 202, directly incident on the sensor 204, etc.), as discussed further with respect to FIGS. 3-4. The term "physical parameters" may relate to an input to the device 104a (e.g., to the sensor 204, the exterior surface 202, or both) that may be measured as a physical phenomenon. Such physical phenomenon may include, but is not limited to, an impulsive force pattern (e.g., finger taps), an audio signal, an optical signal, a pattern of temperature variation within a given time, a magnetic field variation, a chemical variation, or other types of physical phenomena that may be sensed by the sensor 204, or combinations thereof.

In one aspect, the input pattern source 214 may be a mechanical output generator, an acoustic output generator, an infrared output generator, an optical output generator, an electrical output generator, a magnetic output generator, or an electromagnetic output generator, and the like, or combinations thereof. For example, such a mechanical output generator may generate a mechanical parameter that is receivable at the exterior surface 202. Such mechanical parameters may be a force pattern, a specific movement of the device 104a (e.g., shaking of the device 104a in a predetermined manner), a pressure pattern, a torque pattern, and/or a temperature pattern. Likewise, the input pattern source 214 may be a sound producing device, a light source/an optical source, a voltage pattern source, and the like.

Alternatively or additionally, the input pattern source 214 may be a human appendage or a robotic arm. For example, the human appendage may be a finger used to provide two or more tapping actions or finger taps on the exterior surface 202. Such finger taps may be provided anywhere on the exterior surface 202. Likewise, when the device 104a is a work tool, the operator of the machine 102 may tap the device 104a with an appendage of the user of the device 104a or a hard object, for example. The functioning and interaction of the input pattern source 214 with the device 104a is discussed further with respect to FIGS. 3-4.

The sensor 204 may be a mechanical sensor, an electrical sensor, an optical sensor, a thermal sensor, a magnetic sensor, and the like, or combinations thereof. By way of example only and not by way of limitation, the sensor 204 may be or may include a pressure sensor (e.g., that associated with a tire), a piezoelectric sensor, an accelerometer, a gyroscope, a Reed switch, a photodiode, a thin film or a surface acoustic wave sensor, or other types of sensors that are configured to output an electrical signal based upon an input pattern received on the exterior surface 202, for example, from the input pattern source 214. Further by way of example only and not by way of limitation, the sensor 204 may be a microfabricated sensor or a nano-material sensor dimensioned to fit inside the exterior surface 202 of the device 104a, as will be appreciated by one of ordinary skill in the art in view of this disclosure.

In one example, the sensor 204 may be a wireless work tool sensor. Such wireless work tool sensors may include, but are not limited to, wear sensors (e.g., brake wear sensors), asset identification sensors for identifying components of the system 100 and/or the machine 102, and the like.

An output of the sensor 204 is coupled to a signal processor 206. Although not explicitly shown, the signal processor 206 may include circuitry to implement analog filters, amplifiers, noise cancellation circuitry, limiters, an analog-to-digital converter (ADC), digital filters, quantizers, encoders, and other signal conditioning and digital processing circuitry.

The signal processor 206 is coupled to the device processor 208. The device processor 208 is a hardware component such as an integrated circuit (IC) chip fabricated to implement various features and functionalities of the aspects discussed herein. By way of example only and not by way of limitation, the device processor 208 may be fabricated using a Complementary Metal Oxide Semiconductor (CMOS) fabrication technology. The device processor 208 may be implemented as an Application Specific Integrated Circuit (ASIC), a Field Programmable Gate Array (FPGA), a System-on-a-Chip (SOC), or the like. The device processor 208 may include components such as packaging, input and output pins, heat sinks, input devices, output devices, processor memory components, cooling structures, power source and the like, which are not shown in FIG. 2. The device processor 208 may be configured to execute computer executable instructions 216 (stored in the device memory 210), which when executed by the device processor 208 cause the device processor 208 to perform various features and functions for operation of the system 100, as discussed with respect to FIGS. 3-4.

The device memory 210 may be implemented as a non-transitory computer readable medium. Such non-transitory computer readable storage medium may include semiconductor memory, optical memory, magnetic memory, mono- or bi-stable circuitry (flip-flops, etc.) and the like, or combinations thereof. Such non-transitory computer readable storage medium excludes signals that are transitory. By way of example only, the device memory 210 may be implemented as random access memory (RAM), read only memory (ROM), Dynamic RAM, Programmable ROM, Electrically Erasable programmable ROM (EEPROM), Static RAM, Flash memory, combinations thereof, or other types of memory devices known to one of ordinary skill in the art. In one aspect, the device memory 210 is coupled to the device processor 208 directly via an internal bus.

The transceiver 212 is coupled to an output of the device processor 208. The transceiver 212 may be a transmitter and receiver circuit implemented, for example, as a single IC. In one aspect, the transceiver 212 may include a digital filter, a digital-to-analog converter (DAC), a pre-amplifier, one or more electronic switches, and one or more antennas as part of the transmitter circuitry to transmit signals to the machine 102. Likewise, as part of the receiver circuitry, the transceiver 212 may include analog filters, amplifiers, noise cancellation circuitry, limiters, an analog-to-digital converter (ADC), digital filters, quantizers, encoders to forward signals received at the transceiver 212 from the machine 102 to the device processor 208.

INDUSTRIAL APPLICABILITY

The present disclosure is applicable generally to devices for a machine, and more particularly, to a system and a method for wirelessly authenticating a device, associated with a machine, the device having a sensor.

Conventional systems and methods for devices for machines include a predetermined list of devices whose identities are stored in a memory of the machine prior to a particular device in the list being used. In use, the device simply has to transmit its device identifier to a reader or a computer, and the identifier is then matched up with the predetermined list to determine if the device is a known device. Such transmission of the device identifier may occur automatically without a manual input or a user input when the device is in a vicinity of the reader or the computer. Alternatively, some conventional devices have a user interface (e.g., push buttons) that are used to initiate transmission of the device identifier to the reader or the computer based upon a manual input to the user interface. An example conventional system where individual electronic keys may be authenticated for control of multiple vehicles is disclosed in U.S. Patent Application Publication No. 2007/0001805.

However, conventional systems and methods are unable to handle scenarios where the device to be identified has no pre-existing user interface on its external surface and does not automatically transmit its identification information. Further, conventional systems and methods are unable to add a new device to a list of valid devices associated with that machine when the device is presented without prior knowledge of the machine or a computer in the machine, and does not have a user interface to initiate such a transmission. In such scenario when a new device is presented to the machine, a system administrator or a back-office personnel have to be contacted to add the new device manually, causing delays and lost opportunity for immediate access to the machine by valid devices. Similarly, deletion of such devices from the list of authorized devices has to be carried out at a back-office at the system administrator level manually.

Various aspects of this disclosure address the complex problem of wirelessly authenticating the devices 104a-104n having no user interface (e.g., buttons, keys, track-pads, touch screens, and the like) to the machine 102 based upon one or more input patterns, and associating and disassociating the devices 104a-104n, e.g., when a particular operation has been performed.

Referring to FIG. 3, there is illustrated a method 300 for wireless identification of the device 104a for the machine 102, in accordance with an aspect of this disclosure. FIG. 3 presents the method 300 as a flow diagram, although the method 300 may be understood using other types of presentations such as process diagrams, graphs, charts, equations, timing diagrams, etc. In one aspect, one or more processes or operations in the method 300 may be carried out by the device processor 208 based upon specific movements of the device 104a sensed by the sensor 204 and/or based upon one or more input patterns of physical parameters received at the device 104a and sensed by the sensor 204. The method 300 may at least partially be implemented by executing the computer executable instructions 216 stored in the device memory 210.

In another aspect, in the method 300, one or more processes or operations, or sub-processes thereof, may be skipped or combined as a single process or operation, and a flow of processes or operations in the method 300 may be in any order not limited by the specific order illustrated in FIG. 3. For example, one or more processes or operations may be moved around in terms of their respective orders, or may be carried out in parallel. The term "flow," as used with respect to FIG. 3, generally refers to a logical progression of operations in an exemplary manner carried out by the device processor 208. However, such a flow is by way of example only and not by way of limitation, as at a time, the flow may proceed along multiple operations or processes of the method 300. Further, the method 300 may be carried out by the device processor 208 for various machines and is not limited to the machine 102. The method 300 may be implemented by the device processor 208 in a high level or a low level programming language (e.g., C++, assembly language, etc.) using logic circuitry within the device 104a and by executing the computer executable instructions 216 in the device memory 210. Furthermore, it will be appreciated that the discussion herein is equally applicable to the devices 104b-104n without departing from the scope of this disclosure.

The method 300 may begin in an operation 302 where the device 104a may be powered on. By way of example only and not by way only and not by way of limitation, the device 104a may be powered on by shaking the device 104a, tapping the device 104a, or bringing the device 104a near a power source or electro-magnetic field. In an exemplary real-world scenario, the user of the device 104a may walk up to the machine 102 and attempt to interact with the machine 102. For example, the device 104a may be a key fob in the user's hand and the machine 102 is an earth moving machine having an operator cab. The user may attempt to open the operator cab using the device 104a (e.g., a key fob) to operate the machine 102.

In one aspect, the device may always be in a powered on mode, for example, by an internal power source such as a battery (not shown) inside the device 104a. When the device 104a is always in a powered on mode receiving continuous electrical supply from the internal power source, the operation 302 may be optional. Likewise, when the device 104a is a passive device, and functions when brought within a range of an electromagnetic field (e.g., a radio frequency (RF) field), the operation 302 may be optional.

In an operation 304, the sensor 204 of the device 104a may be calibrated. In one aspect, such calibration of the sensor 204 may be performed by the device processor 208 to detect valid input patterns among a plurality of input patterns from the input pattern source 214 and/or from specific movements of the device 104a (e.g., shaking or rotation of the device 104a in a predetermined manner). For example, when the device 104a is a key fob, the key fob may be placed where it receives a range of mechanical inputs on the exterior surface 202. The device processor 208 calibrates the sensor 204 to forward electrical signals to device processor 208 only when the mechanical inputs are of a predetermined amplitude and frequency. The sensor 204 may ignore random inputs received at the exterior surface 202 when the device 104a is positioned on a key chain and accidentally bumps into other keys or objects attached to the key chain. Similarly, the sensor 204 may ignore the mechanical input resulting from the device 104a accidentally falling down on a surface or ground and generating a mechanical force input on the exterior surface 202. In yet another example, the sensor 204 may be calibrated such that only predetermined pressure inputs are forwarded to the device processor 208, e.g., a variation in a pressure corresponding to 10 psi for three times in 5 s, and other types of pressure variations are ignored. In still another example, the sensor 204 may forward electrical signals to the device processor 208 corresponding to optical signals that have a prefixed amplitude, phase, and frequency, and may reject other optical signals (e.g., ambient light) as invalid inputs or noise.

In another aspect, the sensor 204 may forward all types of input patterns detected or sensed at the exterior surface 202 but the device processor 208 may execute the computer executable instructions 216 to check for calibrated input patterns from the sensor 204. In this aspect, the calibration of the sensor 204 may be optional and the flow may proceed to an operation 306 from the operation 302. The device processor 208 may make a determination of valid and invalid input patterns received on the exterior surface 202 of the device 104a. For example, the device processor 208 may only process signals from the sensor 204 that fall within predefined threshold parameters (e.g., 100 mA peak amplitude at 10 Hz frequency, etc.).

In yet another aspect, the calibration of the sensor 204 may be carried out by a physical design of the sensor 204 prior to use with the machine 102. For example, the sensor 204 may be a piezoelectric crystal that operates within a fixed frequency range and amplitude, a photodiode having a high noise sensitivity to reject optical inputs below a threshold amplitude and frequency (or, equivalently, wavelength), and the like. The sensor 204 may include one or more electrical and/or optical filters to reject certain values of the physical parameters received on the exterior surface 202 and accept certain other values, depending upon the application in which the device 104a is being used. It will be appreciated that the calibration of the sensor 204 may be carried out prior to, during, or after use of the device 104a with the machine 102. As such, a timing of the calibration may be independent of the use of the device 104a with the machine 102 in the system 100.

In another example, the calibrating of the sensor 204 may be carried out to ignore taps less than 16 G force when the sensor 204 is, for example, an electronic key fob. In another example, the calibrating of the sensor 204 may be carried out based upon a pressure sensitivity of the sensor 204, for example, to filter differences of 1-2 psi in consecutive cycles of operation of the device processor 208. Such cycles may be determined by a clock or timer circuit (not shown) inside the device 104a.

In the operation 306, the device 104a may broadcast or transmit identification signals from the transceiver 212. Such transmission from the device 104a may be carried out when the device 104a is within a predefined distance or communication range of the machine 102. Alternatively, the device 104a may always transmit the identification signal independent of the distance from the machine 102. The identification signal may include information unique to the device 104a. For example, the device 104a may transmit a series of binary data to the ECU 106 as a data packet. The data packet may include a device number of the device 104a, a list of valid machines that the device 104a may be used with, values of the physical parameters required for communication between the machine 102 and the device 104a, a maximum distance for communication between the machine 102 and the device 104a, and the like. Additionally or optionally, the device 104a may transmit sensing data at the sensor 204 such as pressure, wear level or percentage, a type of the work tool, usage hours, and the like, or combinations thereof.

In one aspect, the device 104a may broadcast the data packet to indicate to the ECU 106 that the device 104a is a recognized device compatible with the machine 102. Therefore, the machine processor 108 may know from the data packet that the device 104a already exists in a list of devices in the memory 110 of the ECU 106.

In the operation 308, the device processor 208 determines whether an authentication signal from the ECU 106 of the machine 102 was received at the transceiver 212 indicating that the device 104a is allowed to access and/or operate the machine 102. The device processor 208 may run an internal clock to check for the authentication signal to arrive from the ECU 106 within a predetermined amount of time. When the authentication signal arrives from the machine 102 within the predetermined amount of time, the device processor 208 may reset the internal clock. By way of example only, the authentication signal may include a data packet that may have a specific bit position set to a binary '0' or a binary '1' value to indicate whether the device 104a has been authenticated.

When the device 104a is authenticated based upon a broadcast identification signal and exists in list of devices in the memory 110, the device 104a is said to be in a normal mode of operation with the machine 102. In such a normal mode, the device 104a may not need to detect any input received on the exterior surface 202, for example, for association or disassociation with the machine 102. Accordingly, the sensor 204 may be turned off by the device processor 208 or the output of the sensor 204 may be ignored by the device processor 208. Further, the normal mode may include information from the device 104a regarding a proposed interaction that the device 104a may involve the machine 102 in. For example, when the device 104a is a work tool, the device 104a may indicate that the device 104a intends to associate with the machine 102 to test or service the device 104a for use with the machine 102. In one aspect, the device 104a, under such normal mode of operation, has to be within a communication range of the machine 102 to gain access to or operate the machine 102, as discussed with respect to the operation 310.

In the operation 310, upon authentication, the device 104a may access and/or operate the machine 102. The access of the machine 102 by the device 104a may include actions such as opening an operator cab of the machine 102 to gain entry, unlocking a latch of the machine 102 to attach the device 104a physically to the machine 102, opening an optical port of the machine 102 to send data from the device memory 210 to the ECU 106 optically, altering a physical parameter of the machine 102 to change an operation thereof (e.g., speed, tilt, output force, etc.), and the like. Generally, in the operation 310, the terms "access" or "operate" with respect to the system 100 may relate to the device 104a being used for one or more interactions with the machine 102, e.g., to alter a physical parameter of the machine 102. The physical parameter may include a simple opening of a door of the machine 102, altering an output of the machine 102, or a complex operation of changing a component of the machine 102, e.g., for repair, cleaning, maintenance, and/or replacement.

However, when the device processor 208 does not receive an authentication signal from the machine 102 for a predetermined amount of time, the device processor 208 may carry out an operation 312. Alternatively, when the authentication signal is not received, the device 104a may attempt one or more additional broadcasts such as that carried out in the operation 306 before the device processor 208 carries out the operation 312.

In the operation 312, the sensor 204 may sense a first input pattern of physical parameters on the exterior surface 202. The first input pattern may be output as a binary pattern corresponding to the input pattern sensed by the sensor 204 at an output of the sensor 204 for forwarding to the device processor 208. The device 104a may then transmit, for example, a hexadecimal pattern of A1-A2-A3-B1-B2 corresponding to a request for association with the machine 102 from the transceiver 212. The sensor 204 may be instructed by the device processor 208 to begin sensing the input patterns on the exterior surface 202 based upon the device processor 208 determining that the device 104a was not authenticated for use with the machine in the operation 308. For example, the device processor 208 may turn the sensor 204 on using a transistor switch (not shown) between the device processor 208 and the sensor 204. In one aspect, the sensor 204 may solicit an input pattern from a user of the device 104a. For example, based upon one or more signals from the device processor 208, the sensor 204 may output an optical signal, an acoustic signal, a haptic actuator signal (e.g., a vibration signal) or other types of indications indicating that the device 104a was not authenticated or recognized by the machine 102. Alternatively, the sensor 204 may not output any indication and the user may automatically, as a part of operation of the device 104a provide a first input pattern on the exterior surface 202, which first input pattern is then sensed by the sensor 204.

By way of example only and not by way of limitation, the first input pattern of physical parameters may include three double-taps in 5 s from a user's appendage, a pressure variation of 10 psi three times in 5 s, three optical pulses in 1 s, an acoustic output pulse (beeps) repeated in a predetermined manner, and the like or combinations thereof. The first input pattern may be generated by the input pattern source 214, a human or robotic operator of the device 104a and/or the machine 102, or both. For example, when the device 104a is a tire that needs to be replaced, the sensor 204 may be a pressure sensor that receives three bursts of pressurized air at 10 psi in 1 s. The sensor 204 detects the first input pattern as the three bursts of air and forwards a corresponding signal to the device processor 208 via the signal processor 206. Similarly, when the device 104a is a work tool to be attached to the machine 102, the work tool may be tapped using a mechanical implement (e.g., pocket hammer) or other device in a specific movement pattern at a specific intensity level for the sensor 204 to detect the first input pattern. The first input pattern may be predetermined or may be programmed by the user of the device 104a.

In one aspect, the input patterns received at the sensor 204 may be customizable for one or more of the devices 104a-104n, for different types of machines, and/or for different users of the devices 104a-104n and/or the machine, for example, during the calibration of the sensor 204 carried out in the operation 304. Such input patterns may be stored in the device memory 210 as equivalent binary patterns after being processed by the signal processor 206 and the device processor 208. Further, it will be appreciated that the input patterns may be received anywhere on the exterior surface 202 or at a specific location (e.g., directly, without physical obstruction by objects in front of the sensor 204 for optical input patterns) depending upon the type of the sensor 204 and the type of the device 104a.

In an operation 314, the device processor 208 determines whether the first input pattern received on the exterior surface 202 and sensed by the sensor 204 is for an association mode of the device 104a with the machine or for a disassociation mode of the device 104a with the machine 102. The association mode of the device 104a may relate to establishing a dedicated wireless communication channel between the device 104a and the machine 102, for example, to access or operate the machine 102. The disassociation mode of the device 104a may relate to the device 104a relinquishing the dedicated wireless communication channel, or disconnecting communication with the machine 102.

The disassociation of the device 104a from the machine 102 may be determined for a scenario when the device 104a is already associated with the machine 102 (e.g., based upon the broadcast information to the machine 102 in the operation 306). For example, the device 104a may have been associated with the machine 102 for a period of time allowed for the device 104a. When the period of time lapses, the machine 102 may send a signal to the device 104a at the transceiver 212 that the device 104a should disassociate. The user of the device 104a may then provide a second input pattern to indicate to the device processor 208 that the device 104a should disassociate from the machine. The second input pattern for disassociation may be sensed by the sensor 204 and a corresponding signal forwarded to the device processor 208 to disassociate the device 104a from the machine 102.

In another example, the device 104a may have completed the operation that was carried out after the device 104a had previously associated. Thus, the device 104a may no longer need to associate with the machine 102 and the device processor 208 may determine that the device 104a can now disassociate with the machine 102. This may free up a frequency or bandwidth of communication that was used by the device 104a to communicate wirelessly with the machine 102 so that other ones of the devices 104b-104n may use that relinquished frequency or bandwidth. The operator of the machine 102 or a user of the device 104a may know about a completion of the operation of the machine 102 using the device 104a and may then provide the second input pattern that the sensor 204 may sense. Similar to the first input pattern, the second input pattern may be of one or more physical parameters, e.g., tapping actions or specific movements of the device 104a, specific optical inputs from the input pattern source 214 operated by the user, air pressure input patterns, or other physical parameters, and the like, or combinations thereof.

In an operation 316, the transceiver 212 may transmit a disassociation signal to the machine 102. The disassociation signal may include a data packet having a specific binary sequence that is interpretable by the machine processor 108. For example, the disassociation signal may include a device identifier for the device 104a, a reason for disassociation (e.g., due to the machine 102 being derated or due to a part of the machine 102 being replaced, etc.), a serial number of the device 104a and the like. In one aspect, the device 104a may transmit a hexadecimal pattern A1-A2-A3-D1-D2 indicating to the machine processor 108 that a disassociation from the machine 102 is being requested based upon the second input pattern received at the device 104a. The machine 102 may decode the binary pattern for the disassociation signal and may subsequently delete an entry for the device 104a in the list of devices stored in the memory 110. Upon sending the disassociation signal, the device 104a may receive the authentication signal 320 from the machine 102 (discussed with respect to an operation 320 below) acknowledging a disassociation of the device 104a. In this respect, the disassociation mode of the device 104a is confirmed by the device processor 208 upon receipt of the acknowledgement signal from the machine 102, either as part of the authentication of the device 104a or independently. Alternatively or additionally, the flow of the method 300 may proceed to an operation 326 and end.

In one aspect, the disassociation signal may not indicate a complete disassociation of the device 104a from the machine 102. Rather, the disassociation signal may relinquish a control of the machine 102 but the device 104a may still be in a passive or a partial communication mode with the machine 102 in which the device 104a simply broadcasts the identification information (similar to the operation 306) to maintain the wireless communication channel established with the machine 102. Such a passive communication mode may be useful when the device 104a has to frequently associate or communicate with the machine 102 for accessing or operating the machine 102, and the device 104a need not carry out additional or new requests to authenticate to the machine 102.

In yet another aspect, the disassociation signal may be based upon a lapse of a period of time since the identification signal was transmitted from the device 104a in the operation 306 and no return acknowledgment or authentication was received from the machine 102.

In an operation 322, the device processor 208 may determine if a timeout has happened since the disassociation signal was transmitted and an acknowledgement signal was not received at the device 104a. The timeout may be indicated by a lapse of a time period (e.g., a counter of the device processor 208 resetting). If a timeout has not happened, the device 104a continues to determine whether the input pattern(s) received at the device 104a is/are for the association mode or the disassociation mode. Alternatively, the device 104a may continue to access or operate the machine 102 per the operation 310 when the timeout has not happened.

However, if in the operation 322, the device processor 208 determines that the timeout has occurred, the device processor 208 carries out an operation 324 in which the device processor 208 reconsiders whether or not to continue accessing or operating, or otherwise generally interacting with the machine 102. If not, the flow of the method 300 ends in the operation 326 and the device 104a disassociates with the machine 102. If yes, the device 104a may go back to broadcasting the identification signal per the operation 306 to continue operating or accessing the machine 102, per the operation 310. In one aspect, after the operation 316 has been carried out, the device processor 208 of the device 104a may not carry out the operations 322 and 324, and may directly end any further interaction with the machine 102, per the operation 326.

Referring back to the operation 314, when the device processor 208 determines that the device 104a is not a recognized device for the machine 102, in an operation 318, the device processor 208 may transmit an association signal to the machine 102 requesting addition of the device 104a as a valid device for the machine 102. The association signal may include a request to add and/or authenticate the device 104a to the machine 102. For example, the authentication signal may include the first input pattern that indicates to the machine processor 108 of the machine 102 that the device 104a needs to be added to the list of devices stored in the memory 110 of the machine 102.

In the operation 320, the device processor 208 may receive an authentication signal from the machine 102 indicating that the device 104a has been associated with the machine 102. The authentication signal may include a time stamp indicating to the device processor 208 that the device 104a has been added as a valid device for the machine 102 for all times, for a specific period of time, for a specific interaction with the machine 102, or combinations thereof. Alternatively, the authentication signal may be used to decline access of the machine 102 by the device 104a. Such declining of access may be implemented as a security feature on the machine 102, as discussed with respect to FIG. 4. For example, in case the authentication fails, the device 104a may not be associated with or disassociated from the machine 102. Upon receipt of the authentication signal associating the device 104a to the machine 102, the device 104a may operate or access the machine 102, per the operation 310.

Further, the operations 322 and 324 may be carried out depending upon whether the device 104a associates with the machine 102 for a limited period of time or unconditionally for an unlimited period of time. Such information regarding conditions for the access or operation of the machine 102 by the device 104a may be included as part of the authentication signal received at the transceiver 212 and processed by the device processor 208. Upon an expiry of such conditions of access or operation, as indicated in the authentication signal, the flow in the method 300 may proceed to the operation 326 where further access or operation of the machine 102 by the device 104a may be disabled or may proceed to the operation 314 where the device processor 208 may check for the second input pattern to enter the disassociation mode for the device 104a.

It will be appreciated that the input patterns sensed by the sensor 204 in the device 104a may be mapped to different modes of operation of the device 104a with respect to the machine 102, and are not limited to the association mode or the disassociation mode only. For example, the input patterns may include additional physical input parameters that indicate proper and defined usage of the device 104a in the system 100. Such defined usage may indicate authorized personnel, authorized operations, compatibility information for the device 104a with the machine 102, and the like, or combinations thereof.

Referring now to FIG. 4, there is illustrated a method 400 for wireless identification of the device 104a by the machine 102, in accordance with an aspect of this disclosure. FIG. 4 presents the method 400 as a flow diagram, although the method 400 may be understood using other types of presentations such as process diagrams, graphs, charts, equations, timing diagrams, etc. In one aspect, one or more processes or operations in the method 400 may be carried out by the machine processor 108 based upon specific movements of the device 104a sensed by the sensor 204 and/or based upon one or more input patterns of physical parameters received at the device 104a and sensed by the sensor 204, which specific movements and input patterns are wirelessly received at the machine 102 after being encoded as wireless signals. The method 400 may at least partially be implemented by executing software stored in the memory 110 of the ECU 106 of the machine 102.

In another aspect, in the method 400, one or more processes or operations, or sub-processes thereof, may be skipped or combined as a single process or operation, and a flow of processes or operations in the method 400 may be in any order not limited by the specific order illustrated in FIG. 4. For example, one or more processes or operations may be moved around in terms of their respective orders, or may be carried out in parallel. The term "flow," as used with respect to FIG. 4, generally refers to a logical progression of operations in an exemplary manner carried out by the machine processor 108. However, such a flow is by way of example only and not by way of limitation, as at a time, the flow may proceed along multiple operations or processes of the method 400. Further, the method 400 may be carried out by the machine processor 108 for various devices and is not limited to one or more of the devices 104a-104n in the system 100. The method 400 may be implemented by the machine processor 108 in a high level or a low level programming language (e.g., C++, assembly language, etc.) using logic circuitry within the ECU 106 and by executing software and computer code in the memory 110. Furthermore, it will be appreciated that the discussion herein is equally applicable to the other types of machines and to multiple machines at the same time without departing from the scope of this disclosure.

The method 400 may be implemented in an exemplary real-world scenario where the machine 102 is deployed on a worksite (e.g., a construction site). The machine 102 may have more than one of the devices 104a-104n that may be attempting to interact with the machine 102. For example, the device 104a may be an electronic key fob that an operator of the machine 102 may possess and may use to open the operator cab of the machine 102. Likewise, the device 104b, for example, may be a bucket that is to be attached to an arm of the machine 102 and the machine 102 may execute the method 400 to initiate and establish a wireless communication with the bucket so that the bucket may be properly installed. The machine 102 may execute the method 400 simultaneously for more than one of the devices 104a-104n, or may execute the method 400 one by one for each of the devices 104a-104n.

The method 400 may begin in an operation 402 where the machine 102 may be initialized. Such initialization of the machine 102 may include starting the engine of the machine 102, checking for one or more signals received at the communication port 112 from one or more of the devices 104a-104n, running diagnostics on various components of the machine 102 by the ECU 106, and the like. In one aspect, the operation 402 may be optional, for example, when the machine 102 is already running or operating when one or more of the devices 104a-104n enter the system 100.

In an operation 404, the machine processor 108 of the ECU 106 may run software in the memory 110 to detect an operational mode of the devices 104a-104n. In the operation 404, the machine processor 108 may be in a discovery mode in which the machine processor 108 may attempt to discover one or more of the devices 104a-104n within a communication range. The operational mode may include the association mode, the disassociation mode, and the normal mode for the devices 104a-104n. In one aspect, the communication port 112 may send the received broadcast information from the devices 104a-104n to a buffer in the machine processor 108, or in the memory 110, for the machine processor 108 to process. The machine processor 108 may detect the identification signals received from each of the devices 104a-104n and decode the identification signals for input patterns corresponding to the association mode, the disassociation mode, and/or the normal mode for the devices 104a-104n. For example, the machine processor 108 may detect a binary pattern corresponding to a request from association with the machine 102 from the device 104c, and another binary pattern for a request for disassociation with the machine 102 from the device 104a, etc.

In another aspect, the machine processor 108 may process the binary patterns corresponding to the devices 104a-104n to determine whether a change in the operational mode was requested by one or more of the devices 104a-104n. For example, the device 104d may have been operating in a normal mode of operation with the machine 102. However, the device 104d may have sent a disassociation signal to disassociate from the machine 102. The machine processor 108 may detect such a request for a change in the operational mode of the device 104d based upon a change in the binary pattern of bits received from the device 104d. For example, a specific bit in the data packet received from the device 104d may be set to low (a binary '0') to indicate a request for disassociation.

In an operation 406, the machine processor 108 may determine whether or not the devices 104a-104n that are requesting association or disassociation with the machine 102 are recognized by the machine 102 or not. In one aspect, the determination of such recognizability of the devices 104a-104n may include a determination by the machine processor 108 regarding a compatibility of the devices 104a-104n. For example, the machine processor 108 may determine that the device 104b is a type of a work tool that may not be used with the machine 102. Accordingly, although the device 104b may be recognized by the machine 102, the device 104b may be deemed as incompatible with the machine 102 by the machine processor 108. The machine processor 108 may recognize the devices 104a-104n based upon whether or not the devices 104a-104n are listed in the list of devices stored in the memory 110.

In an operation 408, if the machine processor 108 recognizes one or more of the devices 104a-104n, the machine processor 108 processes data obtained from the devices 104a-104n based upon one or more of the identification signal received from the devices 104a-104n. In one aspect, the machine processor 108 may process the data to obtain information about how the devices 104a-104n propose to interact with the machine 102. In another aspect, the machine processor 108 may process the data to allow the authenticated ones of the devices 104a-104n to interact with the machine. For example, the machine processor 108 may process the transmission from the devices 104a to determine whether one or more of the devices 104a-104n wants to open a door of an operator cab of the machine 102, replace a work tool of the machine 102, run diagnostic tests on a part of the machine 102, to alter a physical characteristic of the machine 102 (e.g., a speed with which the machine 102 is moving), or other types of operations associated with the machine 102 during the normal mode of operations.

In an operation 410, the machine processor 108 may provide output signals to one or more parts or components of the machine 102 based upon the processed data in the operation 408. Such output signals may be provided for as long as the devices 104a-104n recognized by the machine 102 indicate so, for respective predetermined amounts of time, as may be determined by the machine processor 108, or for a time period corresponding to a completion of the respective interactions of the devices 104a-104n with the machine 102. For example, the machine processor 108 may output a signal to a hydraulic actuator to disengage a coupling mechanism of a work tool attached to the machine 102. The work tool may then be removed and the device 104a may be attached as a new work tool in pace of the disengaged work tool. In another example, the machine processor 108 may send a signal to unlock a door of the operator cab of the machine 102 such that an operator in possession of one or more of the devices 104a-104n may enter the operator cab upon authentication from the machine processor 108. In yet another example, the machine processor 108 may output an optical pattern from a lighting system on the machine 102 for the sensor 204 on the device 104a to determine proper operation of that lighting system. One of ordinary skill in the art reading this disclosure will understand and appreciate that the machine processor 108, upon authentication of one or more of the devices 104a-104n and processing of data received from the devices 104a-104n may modify an output of the machine 102 to allow the devices 104a-104n to interact in the manner requested by the devices 104a-104n, and the example interactions discussed herein are not meant to be limiting in the overall scope of this disclosure.

Referring back to the operation 406, when the machine processor 108 determines whether one or more of the devices 104a-104n are not recognized, the machine processor 108 carries out an operation 412. In the operation 412, the machine processor 108 determines whether a valid input pattern was received from those of the devices 104a-104n that were not recognized by the machine 102 in the operation 406. For example, for the device 104a, the machine processor 108 determines whether or not a valid input pattern was transmitted by the device 104a. Such input pattern may be a binary pattern corresponding to the input pattern sensed by the sensor 204. For example, the device 104a may transmit a hexadecimal pattern of A1-A2-A3-B1-B2 corresponding to a request for association with the machine 102. The machine processor 108 may decode this hexadecimal pattern and determine the pattern as a valid pattern or an invalid pattern, for example, based upon a list of valid and invalid patterns stored in the memory 110. If the pattern is determined to be an invalid pattern, the machine processor 108 may revert back to the discovery mode of the operation 404 where the machine processor 108 may search for valid ones of the devices 104a-104n.

In an operation 414, the machine processor 108 may send an authentication signal to the device 104a based upon receiving a valid pattern in the operation 412. The authentication signal may include an acknowledgement signal, although the acknowledgment signal may alternatively be sent independently of the authentication signal by the machine processor 108. In one aspect, the device 104a may transmit the identification signal to the machine 102 declaring that the device 104a is indeed new to the machine 102. In this aspect, the machine processor 108 may verify whether the device 104a was previously presented to the machine 102 and may send an authentication signal to the device 104a. Such presentation of the device 104a as new to the machine 102 may be referred to as a learning mode for the machine 102 in which the machine processor 108 may add the device 104a to the list of devices in the memory 110 based upon an authentication of the device 104a. The flow of the method 400 may then proceed to the operations 408 and 410 under the normal mode of operation, such that the device 104a, upon authentication and addition to the list of devices in the memory 110, may interact with the machine 102.

In another aspect, the machine processor 108 may detect that the device 104a was previously added as a valid device. However, the device 104a may transmit a binary pattern corresponding to a disassociation signal to the ECU 106. For example, the device 104a may transmit a hexadecimal pattern A1-A2-A3-D1-D2 indicating to the machine processor 108 that a disassociation from the machine 102 is being requested. The machine 102 may decode the binary pattern for the disassociation signal and may delete an entry for the device 104a in the list of devices stored in the memory 110. By way of example only, such deletion of the entry for the device 104a may be implemented by resetting a pointer to an address location in the memory 110 where the entry for the device 104a was stored.

It will be appreciated that the operations 402-416 may be carried out by the machine processor 108 by executing software stored in the memory 110. Such software may include computer executable instructions (different from the computer executable instructions 216 of the device memory 210) in a high level or a low level language. In one aspect, distributed computing techniques may be used by the machine processor 108 such that the machine processor 108 may carry out the method 400 partly using computer code stored in the memory 110 and partly using computer code stored off-board the machine 102, for example, in a remote base station computing system (not shown) in communication with the machine 102. It will be further appreciated that the nomenclature corresponding to various operational modes disclosed herein (e.g., the association mode, the disassociation mode, the discovery mode, etc.) may apply only to the devices 104a, only to the machine 102, or to both the machine 102 and the devices 104a-104n as indicated by a context in which such nomenclature may be used, and use of such nomenclature with respect to one of the devices 104a-104n or the machine 102 is not meant as a limitation. Rather, the use of such nomenclature is by way of example and illustration only.

Further, it will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of particular numerical values and/or ranges of values herein are merely intended to serve as a shorthand method of referring individually to each separate value falling within the range, unless otherwise indicated herein, and each separate value is incorporated into the specification as if it were individually recited herein. The methods 300 and 400 described herein can be performed in any suitable order unless otherwise indicated herein or otherwise clearly contradicted by context.

What is claimed is:

1. A method for wireless authentication of a device to a machine, the device having a sensor, the method comprising:
    sensing, by the sensor, a first input pattern of physical parameters received at the device, the first input pattern of physical parameters including a predetermined pattern of moving an entirety of the device;
    wirelessly transmitting, from the device, an identification signal to the machine upon said sensing of the first input pattern of physical parameters;
    wirelessly receiving, at the device, an authentication signal indicating an authentication of the device, wherein the device is configured to interact with the machine upon the wirelessly receiving the authentication signal;
    associating the device with the machine for a predetermined period of time after the authentication signal is received by the device to interact with the machine; and
    disassociating the device from the machine once the predetermined period of time has lapsed.

2. The method of claim 1, wherein the wirelessly receiving includes associating the device with the machine, the associating the device with the machine establishing a dedicated wireless communication channel between the device and the machine, and
    wherein, based upon the associating the device with the machine, the device interacts with the machine to access or operate the machine.

3. The method of claim 2, wherein the associating the device with the machine is allowed for a predetermined period of time.

4. The method of claim 1, wherein the sensing the first input pattern further includes receiving at least one of a mechanical input pattern on an exterior surface of the device, an acoustic input pattern, a thermal input pattern, a magnetic input pattern, or an optical input pattern on the sensor from an optical source.

5. The method of claim 4, wherein the mechanical input pattern includes a series of tapping actions or a series of air pressure inputs, and
wherein the optical input pattern includes a series of optical pulses from the optical source.

6. The method of claim 1, further comprising:
sensing, by the sensor of the device, a second input pattern of physical parameters received at the device; and
wirelessly transmitting, from the device, a disassociation signal based upon the sensing of the second input pattern, the disassociation signal indicating a disassociation of the device from the machine.

7. The method of claim 6, wherein the sensing the second input pattern includes receiving at least one of a mechanical input pattern on an exterior surface of the device, an acoustic input pattern, a thermal input pattern, a magnetic input pattern, or an optical input pattern on the sensor from an optical source,
wherein the mechanical input pattern includes a series of tapping actions or a series of air pressure inputs, and
wherein the optical input pattern includes a series of optical pulses from the optical source.

8. The method of claim 1, further comprising calibrating the sensor to recognize a plurality of inputs in the first input pattern as valid input patterns for the device, said calibrating being carried out prior to the transmitting,
wherein the sensing includes identifying the first input pattern as an association mode of the device for associating with the machine.

9. The method of claim 1, wherein the receiving, at the device, includes receiving an acknowledgement from the machine indicating that the device has been added to a list of devices for the machine.

10. A system for wireless identification comprising:
a machine including an electronic controller unit, the electronic controller unit including:
a machine processor; and
a memory coupled to the machine processor including a list of devices associated with the machine; and
a device including:
a sensor configured to sense a first input pattern of physical parameters received at the device, an entire exterior surface of the device being free from any user interfaces; and
a device processor coupled to the sensor, said device processor being configured to:
wirelessly transmit an identification signal to the machine processor based upon the first input pattern;
wirelessly receive an authentication signal from the machine processor indicating an authentication of the device;
associate the device with the machine for a predetermined period of time after the authentication signal is received by the device processor to interact with the machine; and
disassociate the device from the machine once the predetermined period of time has lapsed.

11. The system of claim 10, wherein the device processor is configured to disassociate the device based upon a second input pattern of physical parameters sensed by the sensor.

12. The system of claim 11, wherein each of the first input pattern and the second input pattern includes at least one of a mechanical input pattern on the exterior surface of the device, an acoustic input pattern, a thermal input pattern, a magnetic input pattern, or an optical input pattern on the sensor from an optical source.

13. The system of claim 12, wherein the device is an electronic key fob having a continuous exterior surface configured to receive the mechanical input pattern, and the sensor includes an accelerometer.

14. The system of claim 12, wherein the device is a work tool having a continuous exterior surface configured to receive the mechanical input pattern, and the sensor is a wireless work tool sensor.

15. The system of claim 10, wherein the device processor is further configured to calibrate the sensor to recognize a plurality of inputs in the first input pattern as valid inputs for the device.

16. The system of claim 10, wherein the machine processor is configured to:
determine a compatibility of the device with the machine;
carry out the authentication of the device based upon the compatibility of the device with the machine;
add the device to the list of devices in the memory upon the authentication of the device; and
wirelessly transmit the authentication signal to the device processor after the authentication of the device.

17. A non-transitory computer readable medium on a device for a machine, the non-transitory computer readable medium comprising:
computer executable instructions for wirelessly authenticating the device to the machine, the computer executable instructions when executed by a device processor cause the device processor to:
receive an output from a sensor on the device, the output corresponding to an input pattern of physical parameters received on the device and sensed by the sensor, the input pattern of physical parameters including a predetermined pattern of moving an entirety of the device;
wirelessly transmit an identification signal to a machine processor in the machine based upon the output of the sensor of the device;
wirelessly receive an authentication signal from the machine processor indicating an authentication of the device to the machine;
associate the device with the machine for a predetermined period of time after the authentication signal is received by the device processor to interact with the machine; and
disassociate the device from the machine once the predetermined period of time has lapsed.

18. A machine comprising an electronic controller unit, the electronic controller unit including:
a memory; and
a machine processor coupled to the memory and configured to:
wirelessly receive an identification signal from a device in a plurality of devices, the identification signal including an identification of the device, the identification signal being generated by the device based upon a first input pattern sensed by a sensor of the device, the first input pattern excluding actuation of a push button on an exterior surface of the device;
identify the device using a list of devices in the memory of the machine based upon the identification signal;
wirelessly transmit an authentication signal to the device based upon the identification of the device, wherein the machine is accessed or operated upon using the device based on the authentication signal;

add the identification of the device to the list of devices when the device is not listed in the list of devices;

associate the device with the machine for a predetermined period of time after the authentication signal is received by the device to interact with the machine; and disassociate the device from the machine once the predetermined period of time has lapsed.

19. The method of claim 1, wherein the predetermined pattern of moving the entirety of the device includes shaking the entirety of the device in a repetitive motion.

20. The system of claim 10, wherein the entire exterior surface of the device does not include any push buttons.

* * * * *